(12) United States Patent
    Wurzer

(10) Patent No.: US 11,934,391 B2
(45) Date of Patent: *Mar. 19, 2024

(54) GENERATION OF REQUESTS TO A PROCESSING SYSTEM

(71) Applicant: IQSER IP AG, Bassersdorf (CH)

(72) Inventor: Joerg Wurzer, Remscheid (DE)

(73) Assignee: IQSER IP AG, Basserdorf (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/210,190

(22) Filed: Dec. 5, 2018

(65) Prior Publication Data

US 2019/0179811 A1 Jun. 13, 2019

Related U.S. Application Data

(63) Continuation of application No. 14/402,888, filed as application No. PCT/EP2012/002227 on May 24, 2012, now abandoned.

(51) Int. Cl.
| | |
|---|---|
| *G06F 16/24* | (2019.01) |
| *G06F 16/242* | (2019.01) |
| *G06F 16/2452* | (2019.01) |
| *G06F 16/2453* | (2019.01) |
| *G06F 40/268* | (2020.01) |
| *G06F 40/284* | (2020.01) |

(52) U.S. Cl.
CPC ........ *G06F 16/243* (2019.01); *G06F 16/2423* (2019.01); *G06F 16/24522* (2019.01); *G06F 16/2453* (2019.01); *G06F 40/268* (2020.01); *G06F 40/284* (2020.01)

(58) Field of Classification Search
CPC .................................................. G06F 16/3329
See application file for complete search history.

(56) References Cited

U.S. PATENT DOCUMENTS

| | | | | |
|---|---|---|---|---|
| 5,479,488 | A * | 12/1995 | Lennig ................ | H04M 3/4931 379/88.04 |
| 6,101,490 | A | 8/2000 | Hatton | |
| 6,842,730 | B1 * | 1/2005 | Ejerhed ............... | G06F 16/3344 704/9 |
| 7,181,438 | B1 | 2/2007 | Szabo | |
| 7,917,497 | B2 * | 3/2011 | Harrison ............. | G06F 16/3334 707/713 |
| 8,516,008 | B1 * | 8/2013 | Marquardt ........... | G06F 16/319 707/802 |
| 10,978,053 | B1 * | 4/2021 | Smythe .................. | G10L 13/02 |

(Continued)

*Primary Examiner* — Mohammad S Rostami
(74) *Attorney, Agent, or Firm* — Grossman, Tucker, Perreault & Pfleger, PLLC

(57) ABSTRACT

The present invention relates to a method for an at least semiautomatic generation of a request to a data processing system with a data pool, wherein a data model, which is usable for the selection of data from the data pool using a query language, forms the basis of the data pool, wherein a user's request made in natural language, which takes place by a user input of terms (user terms) captured as a series of characters (character string), wherein the terms semantically describe the user intended results of the answer of the data processing system on the request that has to be carried out by the data processing system, is analyzed and/or interpreted, and converted into a request in the query language.

13 Claims, 9 Drawing Sheets

(56) References Cited

U.S. PATENT DOCUMENTS

| | | | |
|---|---|---|---|
| 2004/0181390 A1* | 9/2004 | Manson | G06F 40/55 704/2 |
| 2004/0199931 A1* | 10/2004 | Kumar | G06F 7/02 725/19 |
| 2005/0267871 A1* | 12/2005 | Marchisio | G06F 16/3338 |
| 2006/0004721 A1* | 1/2006 | Bedworth | G06F 16/24522 |
| 2006/0059153 A1* | 3/2006 | Lassalle | G06F 16/322 |
| 2006/0129383 A1* | 6/2006 | Oberlander | G06F 40/253 704/10 |
| 2007/0027671 A1* | 2/2007 | Kanawa | G06F 40/143 704/4 |
| 2008/0040345 A1* | 2/2008 | Cameron | G06F 7/02 |
| 2008/0091408 A1* | 4/2008 | Roulland | G06F 40/211 704/9 |
| 2008/0201134 A1* | 8/2008 | Iwakura | G06F 40/284 704/10 |
| 2008/0208837 A1 | 8/2008 | Wang | |
| 2008/0294423 A1* | 11/2008 | Castellani | G06F 11/0793 704/4 |
| 2009/0292687 A1* | 11/2009 | Fan | G06N 5/04 |
| 2009/0306964 A1* | 12/2009 | Bonnet | G06F 40/40 704/9 |
| 2010/0088674 A1* | 4/2010 | Della-Libera | G06F 40/205 717/114 |
| 2011/0099052 A1* | 4/2011 | Brun | G06Q 10/06 706/54 |
| 2012/0116766 A1* | 5/2012 | Wasserblat | G10L 15/08 704/254 |
| 2012/0253793 A1* | 10/2012 | Ghannam | G06F 40/169 704/9 |
| 2013/0006954 A1 | 1/2013 | Nikoulina et al. | |
| 2013/0054612 A1* | 2/2013 | Danielyan | G06F 40/284 707/741 |
| 2013/0332458 A1* | 12/2013 | Culbertson | G06F 16/36 707/739 |
| 2016/0147736 A1* | 5/2016 | Danielyan | G06F 40/30 704/9 |
| 2019/0179316 A1* | 6/2019 | Siskind | G05D 1/0231 |

\* cited by examiner

GENERATION OF REQUESTS TO A PROCESSING SYSTEM

CROSS-REFERENCE TO RELATED APPLICATION

This is a continuation of U.S. application Ser. No. 14/402,888 filed Nov. 21, 2014 which is a U.S. National Phase Application under 35 U.S.C. § 371 of International Patent Application No. PCT/EP2012/002227 filed May 24, 2012.

FIELD OF THE INVENTION

The present invention relates to a method for an at least semiautomatic generation of a request to a data processing system with a data pool respectively data stock, wherein a data model, which is usable for the selection of data from the data pool using a query language, forms the basis of the data pool, wherein a user's request made in natural language, which takes place by a user input of terms (subsequently also referred to as user terms) captured as a series of characters (subsequently also referred to as character string), wherein the terms semantically describe the user intended results of the answer of the data processing system on the request that has to be carried out by the data processing system, is analyzed and/or interpreted, and converted into a request in the query language.

BACKGROUND

In the area of so called Information-Retrieval-Systems, for example so called search engines respectively Internet search engines, various methods for the retrieval of data from a data pool are known. The basis for the data pool is thereby formed by a data model, which enables a request of data from the data pool using a query language of the data processing system. Normally the data of the data pool is structured regarding the respective data model, particularly into data classes according to a certain semantic classification concerning the content type and/or for data attributes concerning meta data.

If the user respectively the operator of a data processing system does not know the data model on which the data pool is based on, thus the available data classes and/or those data attributes, it is difficult to place a precise request respectively search request to the data processing system. The user respectively the operator would at first have to decide, if he wants to search for certain data classes, meaning a certain semantic classification regarding the content type, to search for data attributes, meaning meta data, or to search for conjunctions, which describe the desired information regarding its content, normally as a keyword. This is described in more detail using the following examples:

Example 1: "Artist" is an object, that contains the attribute "artist", that can be of type "artist" or a person, that is related to art, and that with the reason respectively the description "manufacturer" or "author".

Example 2: An object, that meets the description "Manufacturer of DVD players", can contain the text "Manufacturer of DVD players", can hold the attribute "products" with value "DVD player" or can the relation to products of type "DVD player" and can be of type "company" at the same time.

Furthermore problems exist for queries which concern ambiguity of contents. Further problems exist for a query respectively a search for contents of a data class, of which only subordinated data classes are considered in the data pool. This is described in more detail using the following examples:

Example 1: A search is performed for objects which have an attribute with the name respectively the description "job" and the value "artist". But also objects have to be found that have an attribute in the German variant with the name respectively the description "Beruf" (English: profession/job) and the value "Künstler" (English: artist).

Example 2: A search is performed for objects of type "document". This includes objects which are for example of type "Microsoft Word" or "Microsoft Excel".

Example 3: A person can have the role employee or also consultant within a project. In this case consultant could be a subclass of the data class "employee".

In the area of Internet search engines "semantic search engine" concepts are known, wherein it shall be achieved to capture the semantic of a user's respectively an operator's request in natural language in the form of text input and to convert it into one or more corresponding requests in the query language of the data processing system. The concepts known so far do not fulfil the requirements regarding the degree of complexity of such requests and also regarding the delivered answers respectively results to such requests and further comprise several constraints, particularly language constraints with respect to the evaluation.

Against the background of that the present invention is based on the problem to enable user requests in natural language to a data processing system avoiding the previously described drawbacks.

SUMMARY

For the technical solution of this problem the present invention proposes a method for an at least semiautomatic generation of a request to a data processing system with a data pool, wherein a data model, which is usable for the selection of data from the data pool using a query language, forms the basis of the data pool, wherein a user's request made in natural language, which takes place by a user input of terms (user terms) captured as a series of characters (character string), wherein the terms semantically describe the user intended results of the answer of the data processing system on the request that has to be carried out by the data processing system, is analyzed and/or interpreted, and converted into a request in the query language, which is characterized in that the request in natural language captured as a character string is resolved into lexemes, those lexemes are sequentially processed equivalent to their sequence, wherein a meaning of the particular lexeme is determined on the basis of the data model, and a request in the query language is created out of the determined meaning.

A lexeme in terms of the present invention is a meaning unit of linguistic units which can be manifested in different forms of words and thereby does neither consider the precise form of the linguistic unit nor the precise syntactic function of the linguistic unit. In terms of the present invention lexemes conform syntactic words for the greatest possible extent, with the difference that particularly also Asian languages and the like are considered for which no syntactical recognizable division of words within a sentence is known. Syntactic words in terms of the present invention are units that can be shifted within a sentence, which can be swapped and/or divided by insertion of further words. Words in terms of the present invention are thereby the smallest moveable and replaceable units of a sentence concerning the syntactic aspect. Furthermore the usage of the term lexeme in terms of the present invention considers that a given word is reduced to a grammatical basic form in order to enable syntactic-grammatical variants to be balanced.

A request respectively a search request according to the invention is advantageously characterized in that the user respectively the operator intuitively describes the information he is looking for in an input field respectively text field with several words. This request is then divided into its lexical parts and translated into a request in the query language, which goes beyond the mere full text search by combination of key words. An advantageous embodiment of the invention provides that the user input is done by speech control similar input assistance. For this the data processing system advantageously comprises means for speech control and means for the conversion of verbal expressions into a series of characters.

An advantageous embodiment of the invention provides that for each particular lexeme to be used respectively to be processed a check is carried out if a subsequent lexeme in the order is existing, wherein it is checked in this case, if the lexeme currently to be processed is the description of a data source, the description of a data class, or the description of a data attribute of the data model. Inventively it is first checked if the user's request in natural language comprises multiple terms. If this is the case the first term is checked whether a data source, a data class, meaning a semantic classification regarding a content type, or a data attribute, meaning meta data, is existing with this term respectively with this term description.

A further advantageous embodiment of the invention provides that in case the description of a data source or the description of a data class is present, the description is transformed into a parameter of the query language for the selection of data from the data pool, wherein the parameter narrows down the selection of data on data with the description of the data source or the description of the data class. Advantageously the data source is only checked for the first lexeme in the sequence. A data source detected in this way accordingly limits the search area for the request. The term "Amazon" would for example only search in the data which is provided by the company Amazon. If the first term is a data class, the search would accordingly be limited to semantically classified contents regarding a content type. For example a search for the term "book" would only be performed in data which is classified as books from its content type. The information for that is received by the data processing system by usage of the available data model or in an optional embodiment of the invention advantageously by an ontology, in which data classes representing semantic content types can contain respectively comprise different descriptions, so called literary figures, in different languages. Alternatively and/or additionally the data processing system can further comprise or use dictionaries, vocabularies or the like as an ontology-giving respectively—proving source of information.

A further advantageous embodiment of the invention provides that it is checked for the present lexeme to be processed if a subsequent lexeme in the sequence is existing, wherein it is checked in this case if the lexeme currently to be processed is the description of a data source, the description of a data class or a data attribute of the data model.

A further advantageous embodiment of the invention provides that it is checked if the lexeme currently to be used is a filler word, wherein the lexeme currently to be processed is ignored in this case and the subsequent lexeme in the sequence is used.

In a further advantageous embodiment of the invention it is provided that in case the description of a data class is present, it is checked if the request in the query language already contains a parameter which narrows down the selection of data to data with the description of the data class, wherein in this case the currently to be processed lexeme is transformed to a parameter of the query language for selection of data from the data pool, wherein the parameter describes a relation between data objects, which are described with the parameter already contained in the request using the query language, and data objects, which are described with parameters beginning with the description of the currently to be processed lexeme. Inventively the second term of the user's request in natural language is thus analyzed respectively examined, wherein the second term can be a data class, if the first term of the user's request in natural language limits the request to a data source, or wherein the second term can be a search word, if the first term in the user's natural language conforms a data class representing a semantic content type, or wherein the second term can be a data attribute.

A further advantageous embodiment of the invention provides that in case the description of a data attribute is present, the description and the subsequent lexeme in the sequence are transformed into a parameter of the query language as a name-value-pair for the selection of data from the data pool, wherein the parameter narrows down the selection of data to data with the description of the data attribute. The data processing system receives the information required for that by usage of the available data model or in an optional embodiment of the invention from an ontology, in which data attributes (meta data) can contain respectively comprise different descriptions, so called literary figures, in different languages. Alternatively and/or additionally the data processing system can further comprise or use dictionaries, vocabularies or the like as an ontology-giving respectively-proving source of information. If the term of the user's request in natural language is the description of a data attribute, the request respectively the search to the data processing system is inventively narrowed down by amending the request with the attribute value respectively the meta date in this case. This narrowing-down is then used for the subsequent term in the user's request in natural language.

According to another advantageous proposal of the invention in case the description of a data class is present, it is checked if the description is also the description of a data attribute, wherein in this case the currently to be processed lexeme and the subsequent lexeme in the sequence are transformed into a parameter of the query language as a name-value-pair for the selection of data from the data pool, wherein the parameter alternatively narrows down the selection of data to data with the description of the data attribute. Both parameters, which on the one hand describe the data class and on the other hand the data attribute, are combined as an OR-conjunction for request of data.

A further advantageous embodiment of the invention is characterized in that in case no data source, no data class, no data attribute or no remaining lexeme in the sequence in the character string is described, the currently to be processed lexeme is transformed to a parameter of the query language for the selection of data from the data pool, wherein the parameter narrows down the selection of data to data with the currently to be processed lexeme as a free-text search. Inventively the next term of the user's request in natural language can be a keyword which neither represents a data class nor a data attribute and thus advantageously is used for a limiting free text search respectively full text search. If the next term of the user's request in natural language is a data class again, meaning a semantically classified content type, this is inventively interpreted such, that the results search respectively intended with the request have to be linked to contents of this type, meaning this data class.

Advantageously it is checked at once if the data class, which describes a link, is also the description of a data attribute. If this is the case, the previous part of the request to be created in the query language is completed by limitation of this new data attribute and is further completed by adding a logical "OR" to the until then partially created request in the query language. Advantageously this includes using the term following on the description of the data attribute (attribute name) as the attribute value.

With the inventive method the complexity of the request in the query language is advantageously limited to a single relation.

According to a particularly advantageous embodiment of the invention the user input takes place using at least one input assistance, particularly for the semiautomatic creation of complex request. Advantageously the user respectively the operator is guided automatically in formulating a request. Advantageously a list of possible data sources, data classes (semantic content types) and/or data attributes for a selectable input, which can be selected by clicking with the mouse pointer or the like, is shown to the user during the user's input of characters of the character string, preferably during input of the first word. If the entered character string, meaning the first word of the user's input, is a data class, meaning a semantic content type, a list of possible data attributes (meta data) for an input, selectable by clicking with a mouse pointer or the like, is shown to the user for the second word of the character string of the user's input. The display of possible selectable inputs is advantageously carried out by visualization in terms of a so called "drop down"-list which is known from so called internet browsers.

According to another advantageous embodiment of the invention the user's input is carried out for complex or more complex queries using a graphical user interface (GUI) by creation of a request-tree. Thereby the user respectively the operator can compose a request-tree or can concatenate statements, which are usable for the request, in a list for the request in the form of subject-predicate-object. Such a tree or graph representing "subject-predicate-object"-relations is known for example from WO 2009/030288 A1, whose disclosure is explicitly referenced here. The user advantageously defines the root of the request-tree for the inventive creation of the request-tree. For that the user can chose the data class, meaning the semantic classification of a content type, from a list, which is provided by the data processing system respectively by the input assistance, preferably with a graphical user interface or with so called mouse pointers or the like.

At the same time or alternatively the user can add any attributes. In doing so the user can also select from a list of possible data attributes which exist for the previously selected data class as a semantic content type in the data model. The data attributes are selectively concatenated by a logical "AND" or "OR. For each of the attribute names respectively each attribute description advantageously multiple attribute values can be specified which are concatenated by a logical "OR". If the user does not select an attribute name, a free text search respectively a full text search with the stored keywords is initiated.

Subsequently the user can add limiting conjunctions to the object defined this way, comprising the data class which forms the root of the request-tree and/or the data attributes for this data class. For that the user can select those limiting conjunctions for the defined object from a list as well.

If the object concatenated in this way is defined, the user can limit the conjunction himself by selection of a predicate, meaning the reason for a conjunction. Advantageously the data processing system and/or the input assistance provides a selection list as well.

If multiple limiting conjunctions exist, those can advantageously be concatenated by a logical "AND" or "OR" or "AND NOT".

If the user wants to further refine his request respectively his search, he can advantageously limit the objects on the second level of his request-tree using conjunctions again.

In a further advantageous embodiment of the invention the user can save the request-tree as a bookmark in a database or as a new data class of a semantic content type in an ontology, wherein the ontology can subsequently be used by the data processing system for further requests and/or request-trees.

In an advantageous embodiment of the invention the request-tree created with the inventive input assistance is displayed by the graphical user interface (GUI). In a further advantageous embodiment of the invention a window with a list is shown to the user when selecting a node of the request-tree, preferably by double clicking the node, in which the data class and the data attributes as well as the attribute values can be defined. Advantageously a double click on an edge of the request-tree opens a selection list for justification of the conjunction, meaning the predicate.

Object of the present invention is further a data processing system respectively a data processing unit, comprising a processor, which is designed to respectively prepared to carry out an inventive method automatically respectively automated, particularly by loading a corresponding application program realizing the method from a storage means and execution of the application program by the processor.

BRIEF DESCRIPTION OF THE DRAWINGS

Further details, characteristics and advantages of the invention are described in the following using the figures in the drawings of the embodiment. Thereby show.

DETAILED DESCRIPTION

Figure 1:
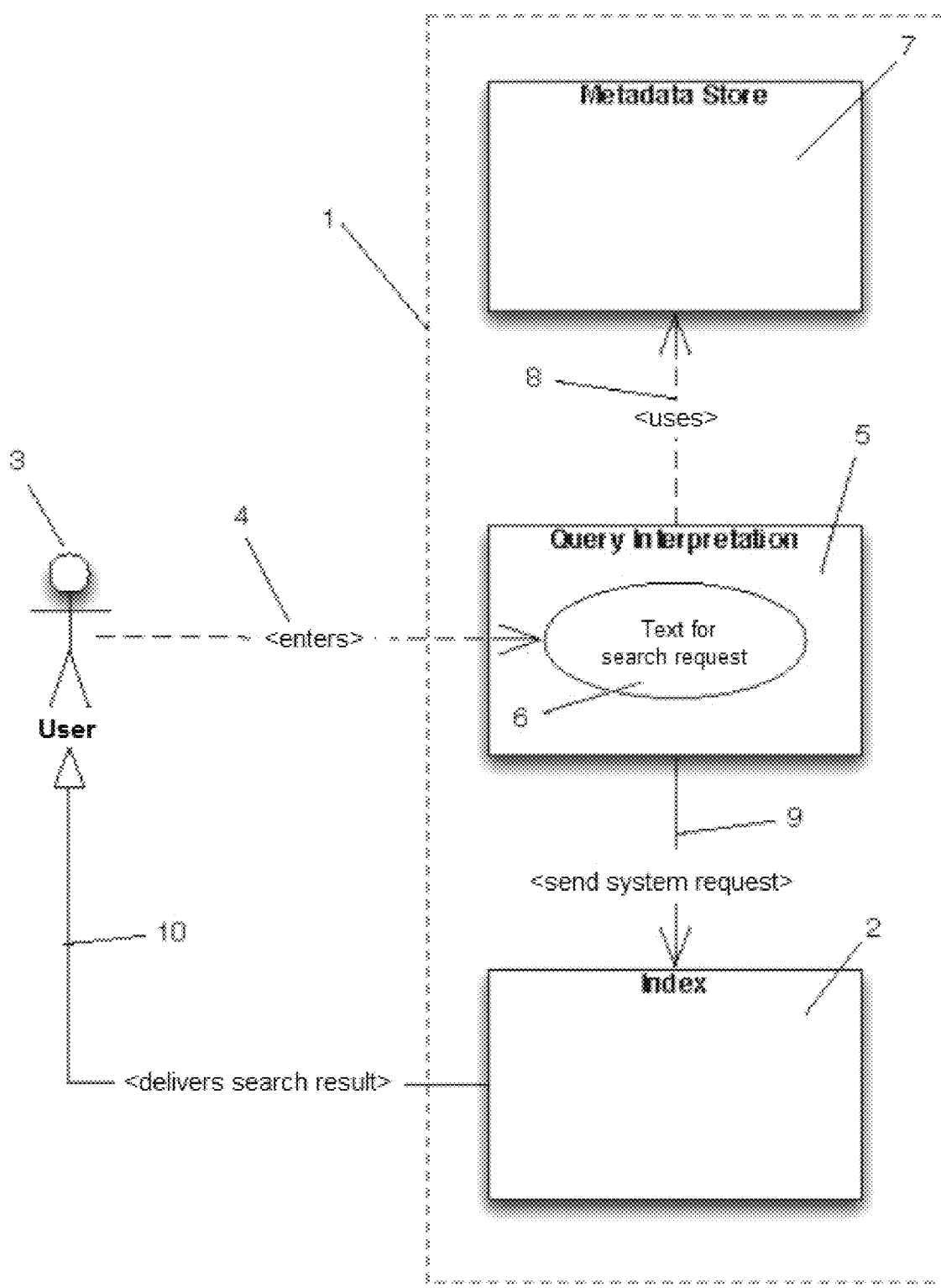
FIG. 1 in a schematic diagram an embodiment for an inventive request to a data processing system.

FIG. 1 shows a data processing system 1 respectively 1' with a data pool 2, which is based on a data model that is usable respectively processible to select data from the data pool 2 using a query language of the data processing system 1. The data processing system 1 comprises an apparatus 5 for analysis and/or interpretation of users' 3 requests 6 in natural language. A user's 3 request in natural language is captured by a user input 4 of user terms, wherein the user terms are captured as a series of characters. The user terms thereby semantically describe the user 3 intended results to the answer of the data processing system 1 on the request that has to be carried out by the data processing system 1. The input 4 of user terms can be carried out by the user 3 manually using buttons of an input device (not explicitly shown in FIG. 1) of the user 3 or using voice control (not explicitly shown in FIG. 1).

A user's 3 request 6 in natural language is analyzed and/or interpreted by apparatus 5 for analysis and/or interpretation of requests in natural language. Therefore the apparatus 5 uses the data model 7 for analysis and/or interpretation of requests 6 in natural language. The meta data thereby are part of the data processing system 1 (marked in FIG. 1 with reference sign 1') or are used from the data processing system 1 by means of a communication connection (not explicitly shown in FIG. 1). During the analysis and/or interpretation of the request 6 in natural language the apparatus 5 converts the user's 3 request 6 in natural language into a request 9 in the query language of the data processing system 1 and directs this to the index or the database of the data pool 2 of the data processing system 1. The result of request 9 in the query language to the index of the data pool 2 of data processing system 1 is then delivered to the user, particularly by means of a graphical playback by a display device (not explicitly shown in FIG. 1) of user 3

FIG. 2 shows in a flow chart (compare FIG. 2a to 2e) an embodiment for a realization of an inventive request to a data processing system using a query language of the data processing system—hereinafter called query—by an algorithm. The elements highlighted in FIGS. 2b and 2e by hatching, are advantageously optional variants of the method and relate on the one hand to the option of a possible semantic double interpretation of a word in case of a conjunction and on the other hand to the option for a filter for filler words, which enables a more intuitive input for the user respectively operator according to a natural language, as well as a more robust interpretation and thus a better result. Embodiment of the inventive method, for which the optional method variants do not apply, comprise instead of the optional elements highlighted with the hatching corresponding references from respectively to each corresponding elements of the flow chart that are not highlighted by hatchings.

Figure 2A:
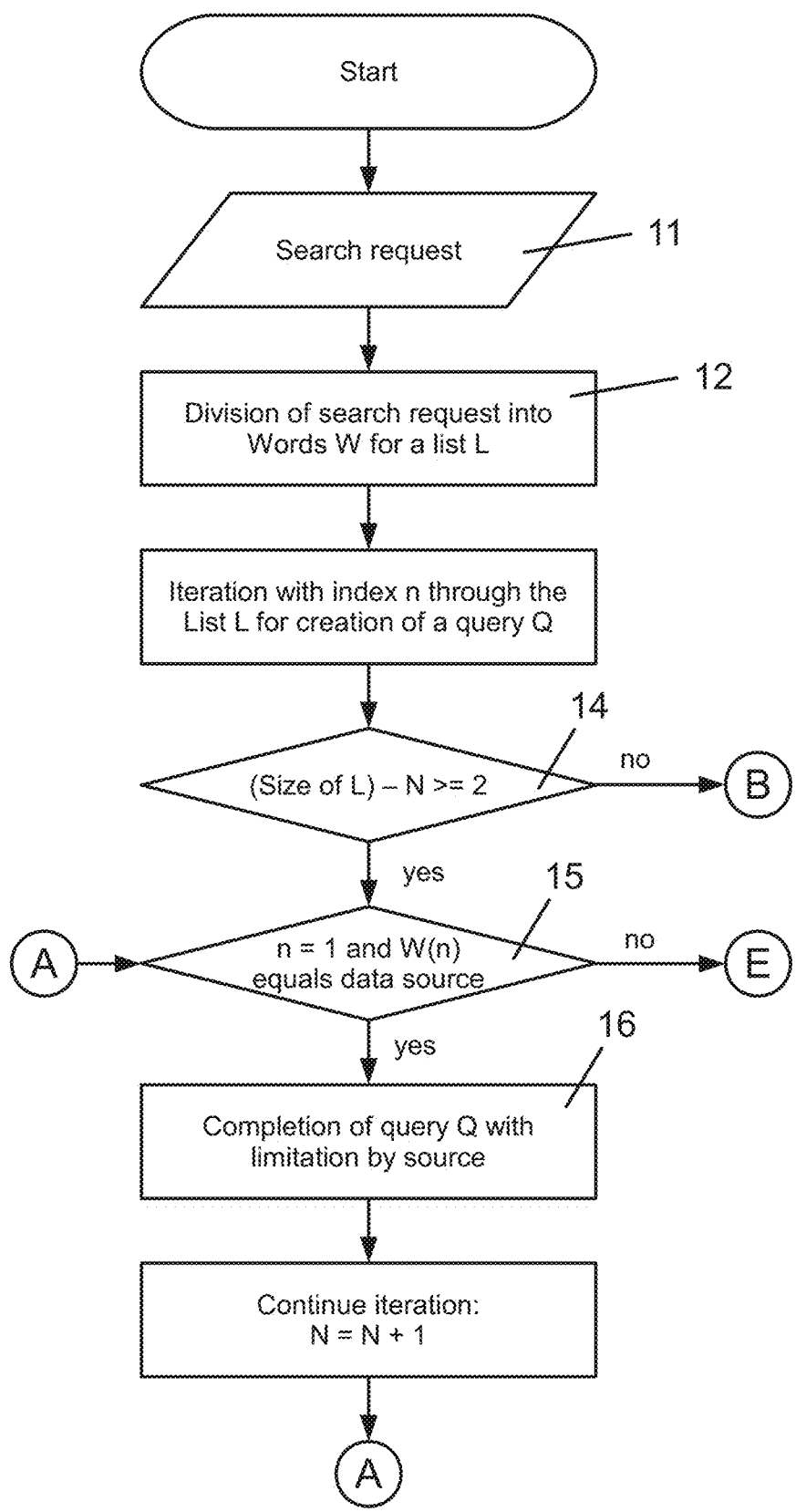
FIG. 2 in a flow chart (FIG. 2a to 2e) an embodiment for a realization of an inventive request to a data processing system.

A simple search request is characterized in that the user describes the desired information in an input field (text field), meaning the terms are entered, which semantically describe the user intended results of the answer to the data processing system on the request that has to be carried out by the data processing system (compare FIG. 2a, reference sign 11). This request in natural language (search request 1) of the user is then divided into its lexical parts, at present lexemes (compare FIG. 2a, reference sign 12), and translated respectively converted into a request in the query language of the data processing system (compare FIG. 2e, reference sign 13), which goes beyond a mere full text search by combination of key words.

In doing so the subsequent element (meaning the next term) of list L is analyzed until the difference of the amount of elements (meaning the terms) of list L and index N for the element (meaning the term) of the recent iteration is bigger than 1 (compare FIG. 2a, reference sign 14).

Subsequently it is validated stepwise if the conditions marked in FIG. 2a with reference sign 15, in FIG. 2b with reference sign 17, and in FIG. 2c with reference sign 19 are fulfilled.

A detected data source (compare FIG. 2a, reference sign 15) would narrow down the search area accordingly (compare FIG. 2a, reference sign 16). Thus the term "Amazon" would only cause a search in data that is provided by Amazon.

A detected data class (semantic classification (content type)) (compare FIG. 2b, reference sign 27, wherein the content type in FIG. 2 is described as object type OT), would narrow down the search, meaning the request in the query language of the data processing system, to correspondingly (content type respectively object type OT) classified contents (compare FIG. 2b, reference sign 18 respectively FIG. 2c, reference sign 27), for example to the content type respectively the data class "book". The data processing system 1 fetches this information from the data model of the data processing system 1. If the request has already been narrowed down by a data class (semantic classification (content type)), the requested contents are narrowed down using a relation R with data that match compare FIG. 2b, reference sign 18) the data class (semantic classification (content type)).

In case of a detection of a data class (semantic content type) (compare FIG. 2b, reference signs 17 and 18) for a relation R to the requested contents it is subsequently validated if the term is further a data attribute (compare FIG. 2b, reference sign 22). If this is the case, the search is further limited to a corresponding attribute value (meta date) (compare FIG. 2b, reference sign 23). For this the previous part of the search request in the query language of the data processing system is completed by limitation of this new data attribute and is further completed by adding a logical "OR" to the previously interpreted search request (compare FIG. 2b, reference sign 23). The term following the attribute name thereby is used as the attribute value.

Figure 2B:
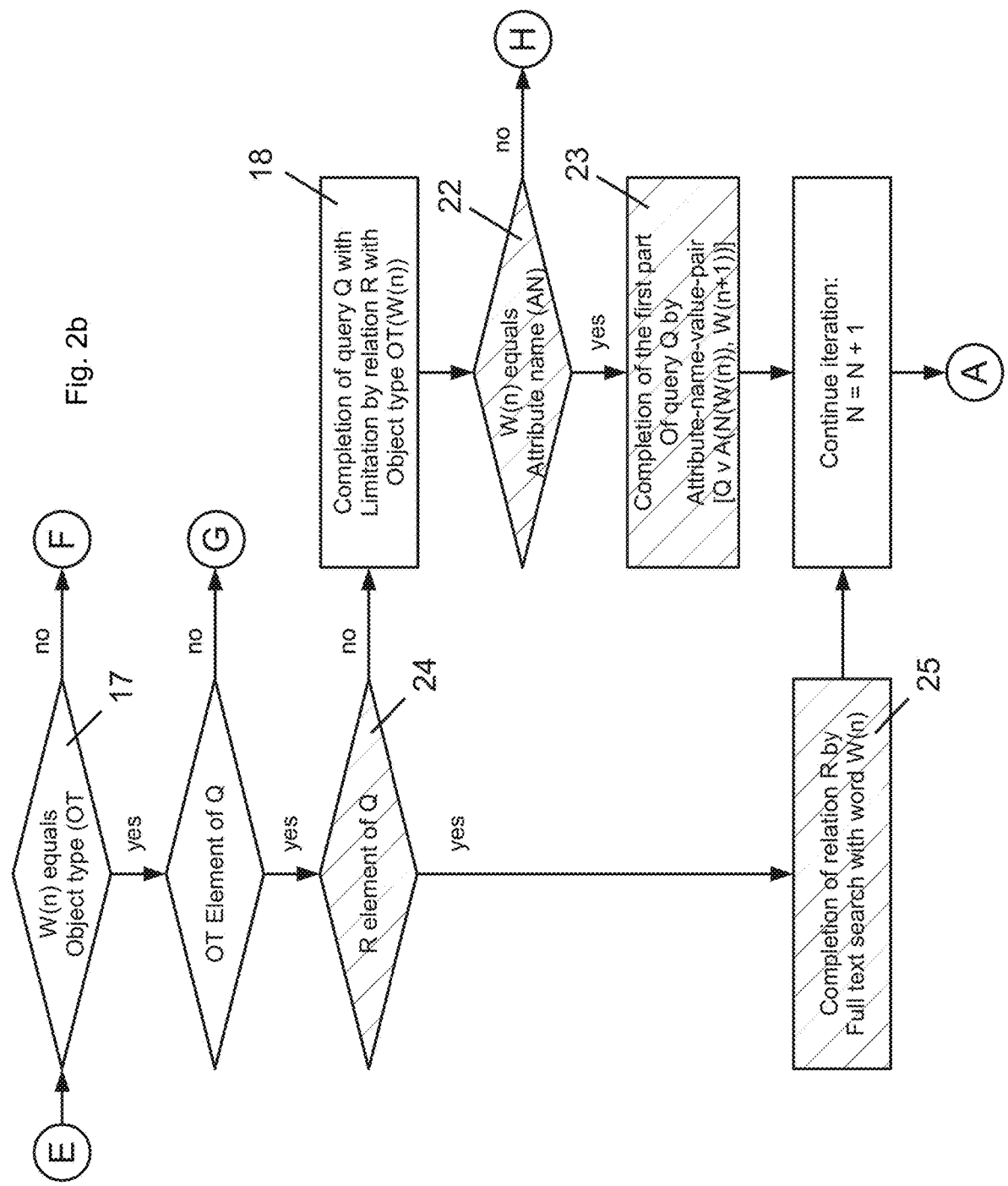

If the request Q has already been narrowed down by a data class (semantic classification (content type)) and already contains a relation R (FIG. 2b, reference sign 24), which contains this data class (semantic classification (content type)), the description of the data class (semantic classification (content type)) is used as a key word for a full text search for further limitation of relation R of request Q (FIG. 2b, reference sign 25).

The described method limits the complexity of request Q to a data processing system using a query language of the data processing system (also called query) to a single relation R.

Figure 2C:
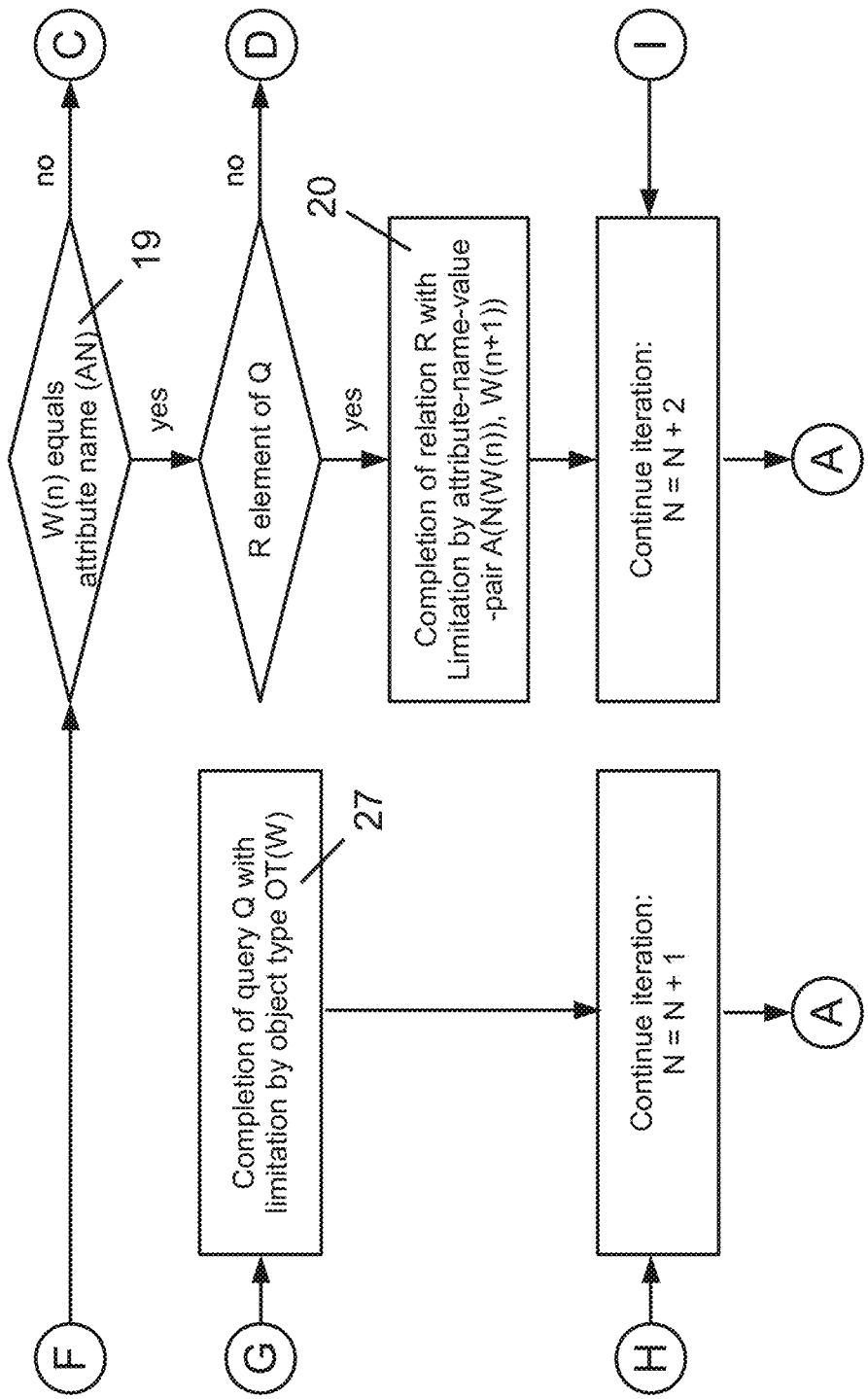

A recognized data attribute respectively a recognized attribute name (compare FIG. 2c, reference sign 19) would limit the search to a corresponding attribute value (meta date) (compare FIG. 2c, reference sign 20 respectively 28). If the relation R is not yet an element of request Q, a limitation of query Q is carried out (compare FIG. 2c, reference sign 28).

Figure 2D:
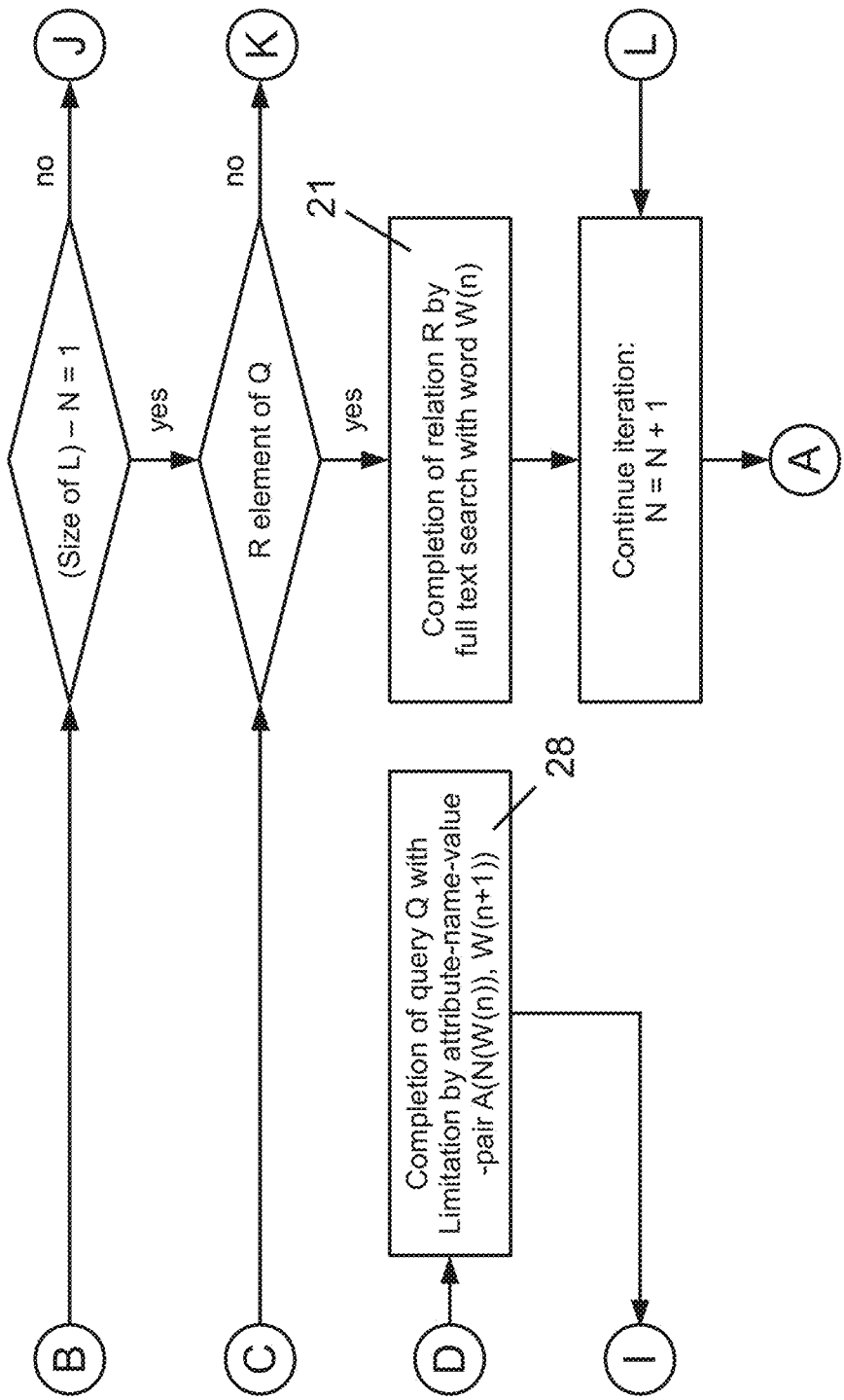
Figure 2E:
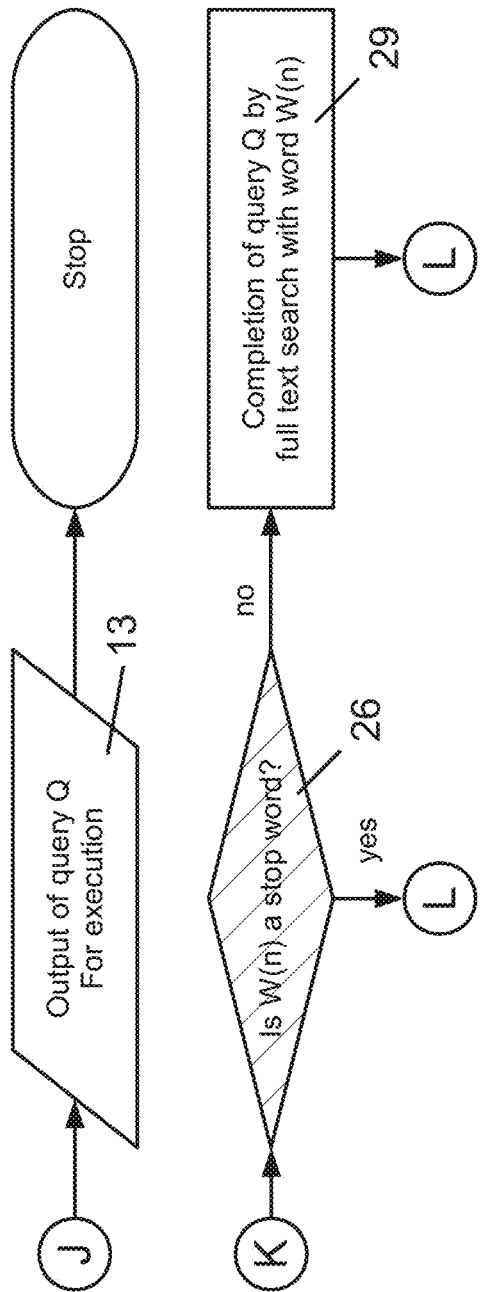

If the next term of the user's request in natural language is a catchword, which does neither represent a data class (a content type) nor a data attribute (attribute name), this term is used for a limiting full text search (compare FIG. 2d, reference sign 21 respectively FIG. 2e, reference sign 29). Thereby a recognition is carried out if the relation R of request Q already contains a parameter, which limits the request to the word W(n) that shall be used for a so called full text search. If this is not the case, a recognition is carried out such if the word W(n) is a so called stop word (FIG. 2e, reference sign 26). If this is not the case, the query Q is completed to a full text search with word W(n) (FIG. 2e, reference sign 29).

Figure 3:
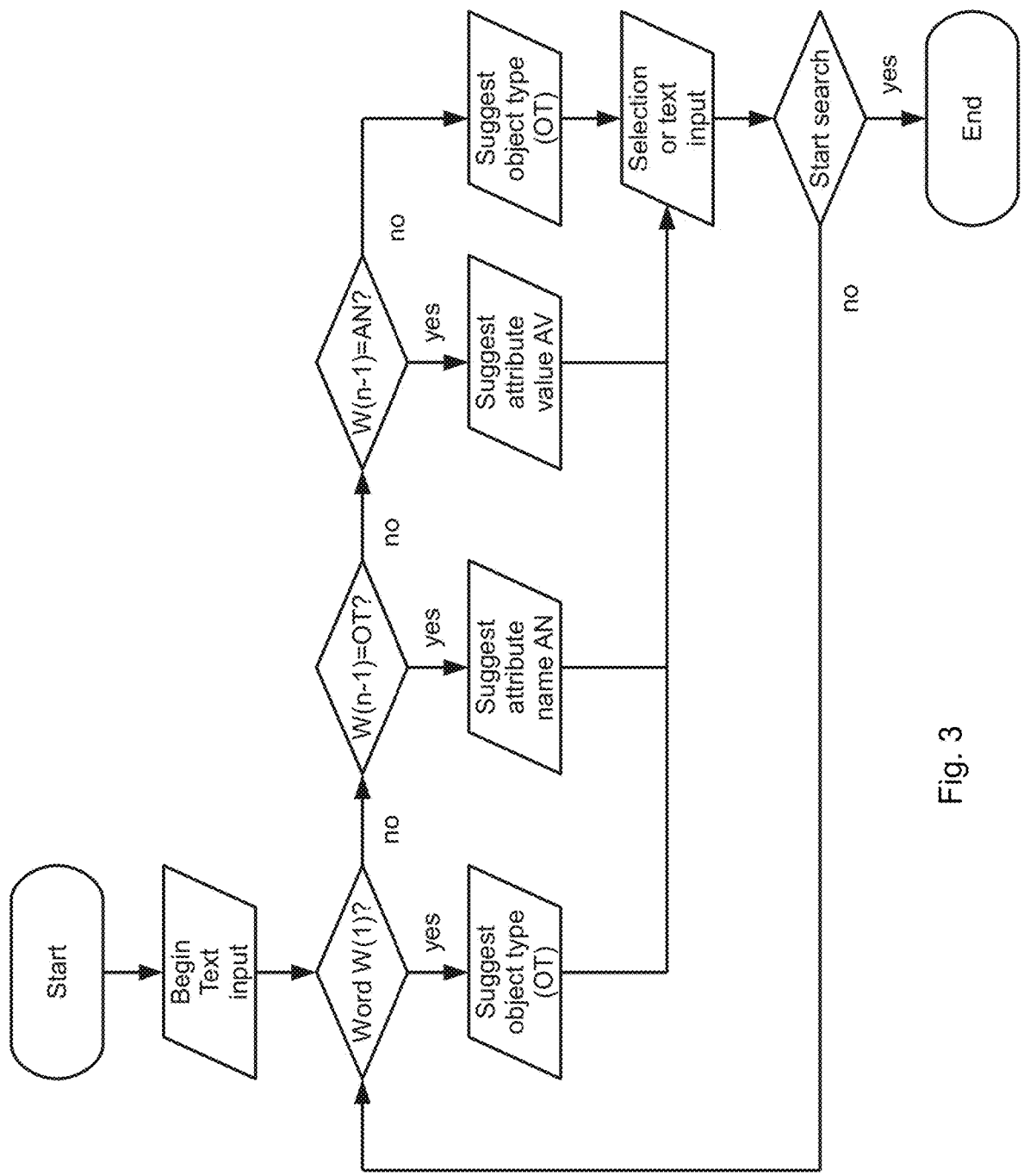
FIG. 3 in a flow chart an embodiment for a realization of an inventive input assistance for the semiautomatic creation of a request to a data processing system.

The flow chart according FIG. 3 shows an embodiment for a realization of an inventive input assistance for the semiautomatic creation of a request to a data processing system. For the input which has to be done by the user using an input field (text field), the following input assistances are provided additionally respectively optionally, which allow a virtual moderation of the search request (query) using the query language of the data processing system:

If the operator begins to type the first word, a list of possible data sources and/or data classes (semantic content types) appears below the input field.

If the first word is a data class (semantic content type), a selection of possible attribute names appears for the second word. The visualization can happen using a drop down list, for example in the way how it is already known from so called browsers for their search area.

Figure 4:
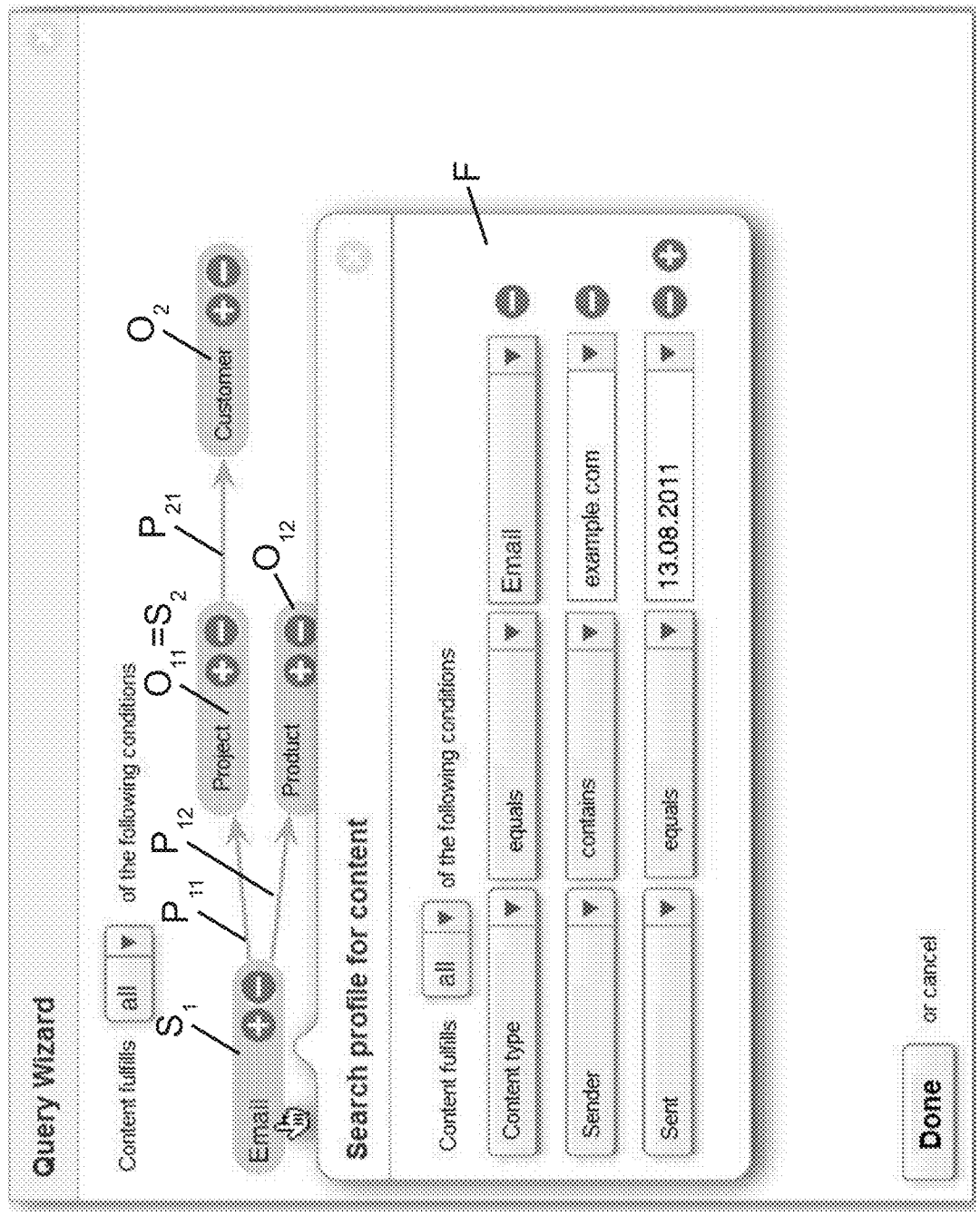
FIG. 4 in a schematic diagram an embodiment for an inventive input assistance for the semiautomatic creation of a request to the data processing system.

FIG. 3 shows how such an inventive moderation of the search request can be realized by an algorithm using input assistances for the suggestion of object types, attribute names and attribute values. FIG. 4 shows a visualization of a corresponding input assistance (subsequently also called wizard) for the user.

The user is guided during the formulation of a search request by the inventive input assistance—subsequently also called wizard: the user creates a request-tree or concatenates statements in the form subject-predicate-object in a list. In doing so the following steps are realized:

1. At first the user defines the root of the request-tree. For that he can chose the data class (semantic content type) from a list. In the embodiment according FIG. 4 this is for example email $S_1$.
2. At the same time or alternatively the user can add any data attributes. In doing so the user can also select from a list of possible data attributes which exist for the selected content type. The attributes are selectively concatenated by a logical "AND" or "OR". For each of the attribute names multiple attribute values can be specified which are concatenated by a logical "OR". If the user does not select an attribute name, a full text search is initiated for the selected content type. In the embodiment according FIG. 4 possible data attributes are presented in window F for the data class email $S_1$.
3. In a third step the user can add limiting conjunctions to the so defined object. The user does the definition of associated objects the same way as it is done for the root of the request-tree.
4. If the object is defined, the user can limit the conjunction of a predicate, meaning the reason for a conjunction, by himself. For that a selection list is available for the user as well, which particularly is reflected in a window according window F of data class email $S_1$. In FIG. 4 the corresponding predicates of data class email $S_1$ are marked by edge $P_{11}$ and $P_{12}$.
5. If multiple limiting conjunctions are existing, those can be concatenated by a logical "AND" or "OR".
6. If the user wants to further refine his search, he can limit the objects of the second level of his request-tree also by conjunctions. In FIG. 4 those are the project $O_{11}$ and the product $O_{12}$, wherein project O11 becomes subject $S_2$ for further refinement, wherein the subject $S_2$ is linked to the object customer $O_2$ via the predicate forming the edge of the graph. The user can save this query-tree as a bookmark in a data base or as a new semantic content type, meaning a new data class, in an ontology which can subsequently be used by the data processing system.

A graphical solution of this input assistance (wizard) is advantageously given by a graphical presentation of the request-tree created this way (compare the graph above window F in FIG. 4). When performing a selection, for example by double clicking the nodes (compare FIG. 4, reference signs $S_1$, $O_{11}$, $O_{12}$, $S_2$, $O_2$), a window with a list is shown to the user (compare FIG. 4, reference sign F), in which the data class (content type) and the attribute names as well as the attribute values can be defined. In contrast to that double clicking an edge (compare FIG. 4, reference signs $P_{11}$, $P_{12}$, $P_{21}$) opens and shows a selection list for the reason of the conjunction (predicate).

Figure 5:
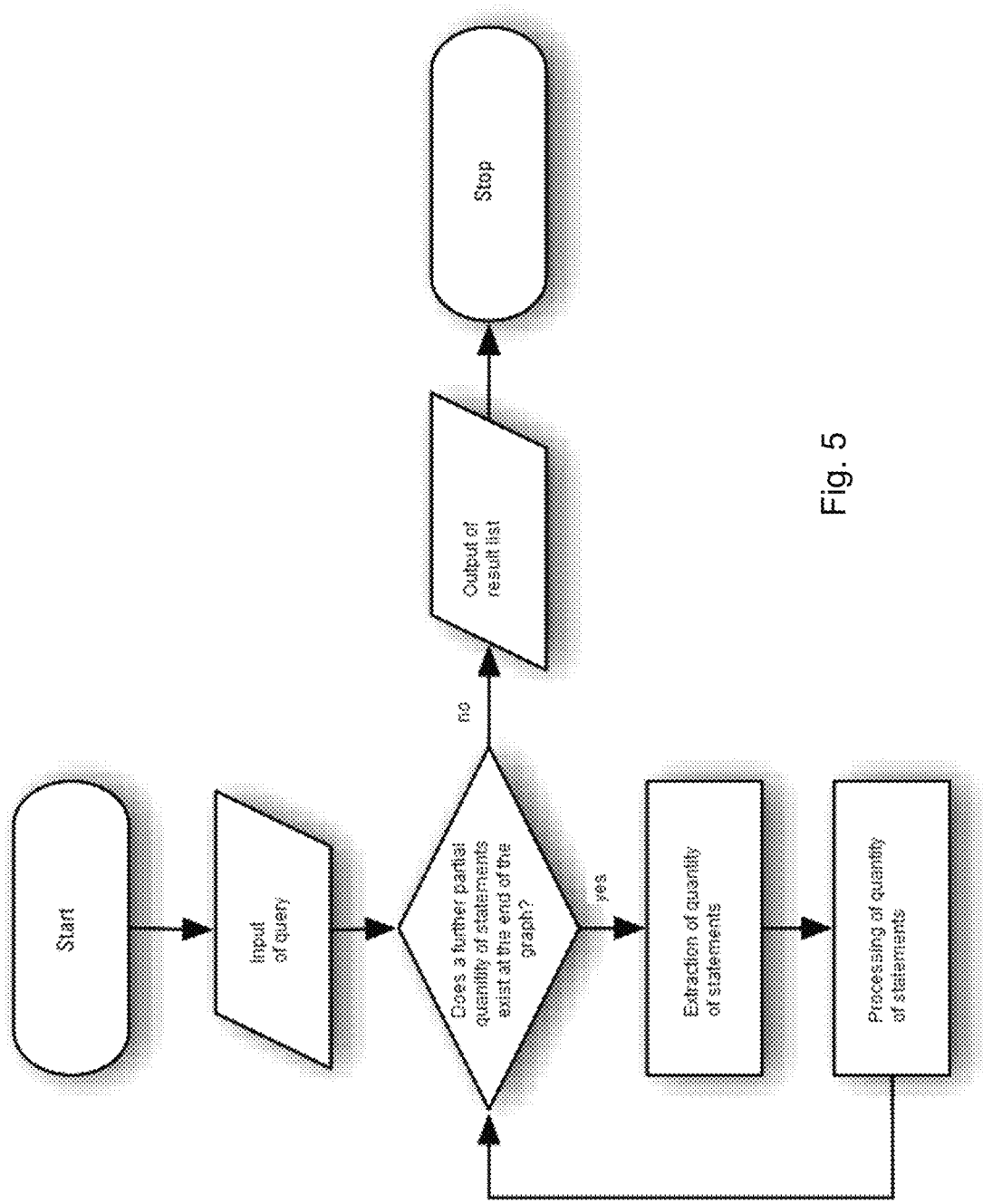
FIG. 5 in a flow chart an embodiment for a realization of a display of results of an inventive request to a data processing system.

FIG. 5 shows in a flow chart an embodiment for a realization of a representation of results of an inventive request to the data processing system.

The embodiments of the invention illustrated in the figures of the drawing and the embodiments of the invention described in this context only serve the explanation of the invention and are not restrictive for the same. FIG. 2 for example describes an embodiment for an inventive realization of a complex request that was for example created with the input assistance (wizard). The complex request thereby is translated into request parts which are combined with each other. This means that the complex request, which represents a graph, is divided into relations (tuples), that are linked to each other.

REFERENCE LIST 1, 1' Data processing system
2 Data pool
3 User (operator)
4 Input of user terms as a series of characters
5 Apparatus for analysis and/or interpretation of requests (6) in natural language
6 Requests in natural language
7 Data model/meta data (literates, dictionaries, vocabularies)
8 Request/usage data model/meta data (7)
9 Request in query language
10 Answer to request in query language
11 Request in natural language
12 Division of request in natural language into lexemes/terms
13 Output of request in query language of data processing system
14 Validation if multiple lexemes/terms exist
15 Recognition data source
16 Completion of request in query language by limitation to data source
17 Recognition data class (semantic content type/object type)
18 Completion of request in query language by limitation to data class (semantic content type/object type)
19 Recognition of data attribute
20 Completion of request in query language by limitation to data attribute
21 Completion of request in query language by full text search
22 Recognition of data attribute
23 Completion of request in query language by limitation to data attribute 24 Recognition of data class (semantic content type/object type) that is already element of the relation of the request in query language
25 Completion of request in query language by full text search
26 Recognition of stop word
27 Completion of request in query language by limitation to data class (semantic content type/object type)
28 Completion of request in query language by limitation to data attribute
29 Completion of request in query language by full text search
W Window
$O_{11}$ Object
$O_{12}$ Object
$O_2$ Object
$P_{11}$ Predicate
$P_{12}$ Predicate
$P_{21}$ Predicate
$S_1$ Subject
$S_2$ Subject

What is claimed is:

1. A method for an at least semiautomatic generation of a request to a data processing system with a data pool,
wherein a data model, which is usable for a selection of data from the data pool using a technical query language, forms a basis of the data pool,
wherein a user's request is made in a natural language as a noun phrase with no interrogatives and verbs, which takes place by a user input of user terms captured as a series of characters that form character strings,
wherein the user terms semantically describe user intended named entities as data objects of a retrieval result from the data processing system based on the user's request, that has to be carried out by the data processing system, and are analyzed, interpreted, and converted into a request in the technical query language,
wherein the request in the natural language as a noun phrase with no interrogatives and verbs captured as a character string is resolved into a plurality of lexemes, the plurality of lexemes having N indexes and being sequentially processed equivalent to their sequence starting from a first index of the N indexes to a last index of the N indexes,
wherein a meaning of a particular lexeme is determined based on the data model matches,
wherein each lexeme is matched sequentially in a determined analysis sequence with a description or name of a data object source, a data object class, its data attributes depending on previous lexemes and their matching results, and finally a lexeme is used as a search word, if each matching of this analysis sequence was negative,
wherein for each particular lexeme to be processed a check is performed if a subsequent lexeme in the sequence exists, and in response to the subsequent lexeme in the analysis sequence existing determining if a current lexeme to be processed is the description or name of a data source, the description or name of a data class, or the description or name of a data attribute of the data model, and
wherein a request in the technical query language for retrieving data objects and not text parts, is created out of a determined meaning without a need of analyzing a grammatical structure, sentence trees or lexical answer types.

2. The method according to claim 1, wherein in case the description of a data source or the description of a data class is present, the description is transformed into a technical parameter of the technical query language for the selection of data objects from the data pool, wherein the technical parameter narrows down the selection of data objects of data with the description or name of the data source and the description or name of the data object class.

3. The method according to claim 1, wherein it is checked if the current lexeme to be processed is a filter word, and in response to the current lexeme to be processed being a filter word, the current lexeme to be processed is ignored and the subsequent lexeme in the analysis sequence is used for the sequential matching of data object class name, data attribute name and full text keyword.

4. The method according to claim 1, wherein in case the description or name of a data class is present, it is checked if the request in the technical query language already contains a parameter which narrows down the selection of data objects to data objects with the description or name of the data object class, wherein in this case the current lexeme to be processed is transformed to a parameter of the technical query language for selection of data objects from the data pool, wherein the parameter describes a relation between data objects, which are specified with the parameter already contained in the request using the technical query language, and data objects, which are specified with parameters beginning with the description of the current lexeme to be processed.

5. The method according to claim 1, wherein in case the description of a data attribute is present, the description and the subsequent lexeme in the analysis sequence are transformed into a parameter of the technical query language as a name-value-pair for the selection of data objects from the data pool, wherein the parameter narrows down the selection of data objects to data objects with a specification of the data attribute.

6. The method according to claim 4, wherein in case the description of a data object class is present, it is checked if the description is also the description of a data object attribute, wherein in this case the current lexeme to be processed and the subsequent lexeme in the analysis sequence are transformed into a parameter of the technical query language as a name-value-pair for the selection of data objects from the data pool, wherein the parameter narrows down the selection of data objects to data objects with a specification of the data attribute such that in the request an OR-conjunction is combined with the request of data objects of a data object class.

7. The method according to claim 1, wherein in case no data source, no data object class, no data object attribute or no remaining lexeme in the analysis sequence in the character string is specified, the current lexeme to be processed is transformed to a parameter of the technical query language for the selection of data objects from the data pool, wherein the parameter narrows down the selection of data objects to data objects with the current lexeme to be processed as a free-text search.

8. The method according to claim 1, wherein the data source is checked only for a first lexeme in the analysis sequence.

9. A method for generation of a request to a data processing system with a data pool, the method comprising:
forming the data pool using a data model, the data model allowing for a selection of data from the data pool using a technical query language;

receiving a user request from a user made in natural language as a noun phrase with no interrogatives and verbs, the user request comprising a plurality of user input terms captured as a series of characters, each series of characters comprising a character string, wherein the user input terms semantically describe user intended named entities as data objects of a retrieval result from the data processing system for the request to be carried out by the data processing system; and converting the user input terms into a request in the technical query language into a plurality of lexemes, the plurality of lexemes having N indexes and being sequentially processed equivalent to their sequence starting from a first index of the N indexes to a last index of the N indexes, wherein a meaning of a particular lexeme is determined on a basis of the data model matches wherein each lexeme is matched sequentially in a determined analysis sequence with a description or name of a data object source, a data object class, its data attributes depending on previous lexemes and their matching results, and finally a lexeme is used as a search word, if each matching of this analysis sequence was negative, wherein for each lexeme to be processed a check is performed to determine if a subsequent lexeme in the analysis sequence exists, and in response to determining a subsequent lexeme in the analysis sequence exists, determining if the lexeme to be processed is the description or name of a data source, a description or name of a data class, or a description or name of a data attribute of the data model, and wherein the request in the technical query language for retrieving data objects and not text parts, is created out of the determined meaning, without a need of analyzing a grammatical structure, sentence trees or lexical answer types.

10. The method according to claim 9, further comprising:

in response to determining if the lexeme to be processed is the description or name of a data class, transforming the description or name of the data class into a parameter of the request in the technical query language, wherein the parameter narrows down selection of data objects to data objects having the description or name of the data class within the data pool; and in response to determining if the lexeme to be processed is the description or name of a data source, transforming the description or name of the data source into a parameter of the request in the technical query language, wherein the parameter narrows down the selection of data objects of data with the description or name of the data source and the description or name of the data object class.

11. The method according to claim 9, further comprising determining if a lexeme to be processed is a filter word, and in response to determining the lexeme to be processed is a filter word, the lexeme to be processed is ignored and the subsequent lexeme in the analysis sequence is used for the sequential matching of data object class name, data attribute name and full text keyword.

12. The method according to claim 9, further comprising:

in response to determining if the lexeme to be processed is a description or name of a data attribute, transforming the description or name of the data attribute and the subsequent lexeme into a parameter of the request in the technical query language as a name-value-pair for selection of data objects from the data pool, wherein the parameter narrows down selection of data objects to data objects with the description or name of the data attribute from the data pool.

13. The method according to claim 9, wherein in instances where no data source, no data class, no data attribute or no remaining lexeme in the analysis sequence in the character string is described, the lexeme to be processed is transformed to a parameter of the technical query language for the selection of data objects from the data pool, wherein the parameter narrows down the selection of data objects to data objects with lexeme to be processed as a free-text search.

* * * * *